United States Patent [19]

Steen

[11] 4,139,790
[45] Feb. 13, 1979

[54] DIRECT AXIS AIDING PERMANENT MAGNETS FOR A LAMINATED SYNCHRONOUS MOTOR ROTOR

[75] Inventor: Charles R. Steen, Novelty, Ohio

[73] Assignee: Reliance Electric Company, Cleveland, Ohio

[21] Appl. No.: 829,269

[22] Filed: Aug. 31, 1977

[51] Int. Cl.$^2$ .......................................... H02K 21/12
[52] U.S. Cl. .................................... 310/156; 310/212; 310/162; 310/166; 310/168
[58] Field of Search ............... 310/156, 211, 212, 162, 310/166, 168

[56] References Cited

U.S. PATENT DOCUMENTS

| | | | |
|---|---|---|---|
| 2,493,102 | 1/1950 | Brainard | 310/156 |
| 2,703,849 | 3/1955 | Worth | 310/156 |
| 2,719,931 | 10/1955 | Kober | 310/156 |
| 2,913,607 | 11/1959 | Douglas et al. | 310/211 X |
| 2,939,025 | 5/1960 | Williford, Jr. | 310/156 X |
| 3,126,493 | 3/1964 | Honsinger | 310/156 |
| 3,210,584 | 10/1965 | Jorgensen et al. | 310/211 X |
| 3,652,885 | 3/1972 | Honsinger | 310/166 X |
| 3,743,873 | 7/1973 | de Jong | 310/156 X |

Primary Examiner—Mark O. Budd
Attorney, Agent, or Firm—Woodling, Krost, Granger & Rust

[57] ABSTRACT

A permanent magnet rotor for a permanent magnet synchronous-run induction-state motor is disclosed. The rotor has Rare Earth magnets disposed in apertures in unitary laminations and parallel to a tangent to the shaft. The magnets are magnetized outwardly so that the direct flux of the magnets is additive to the direct axis flux of the stator at no load. The rotor has a squirrel cage winding and the ends of each magnet aperture are in communication through a flux barrier space to the inner end of an adjacent conductor bar aperture of the squirrel cage winding. The unitary laminations each have an even plurality of radially directed reinforcing ribs disposed along the magnetic neutral axes. The flux barriers are wide relative to the circumferential width of the reinforcing ribs for a minimum of circumferential leakage flux. The leakage flux from one magnet radially through a rib is in opposition to the leakage flux through that rib from the adjacent magnet for substantially zero net leakage flux therein.

40 Claims, 11 Drawing Figures

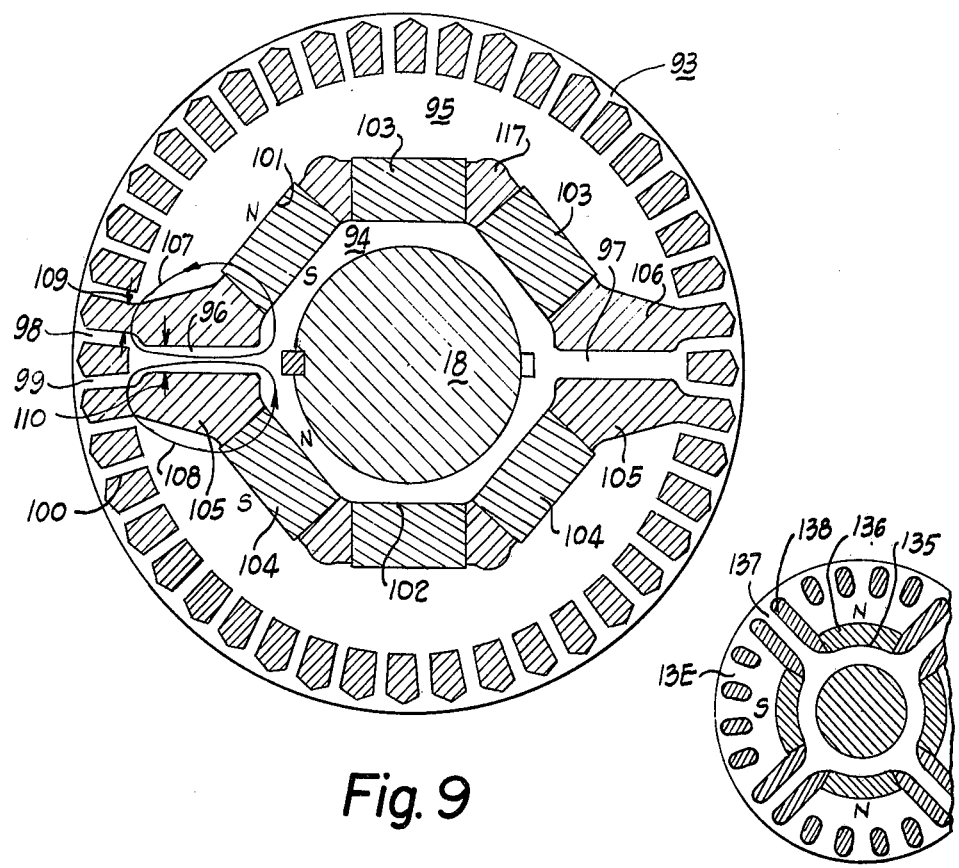
Fig. 9
Fig. 11
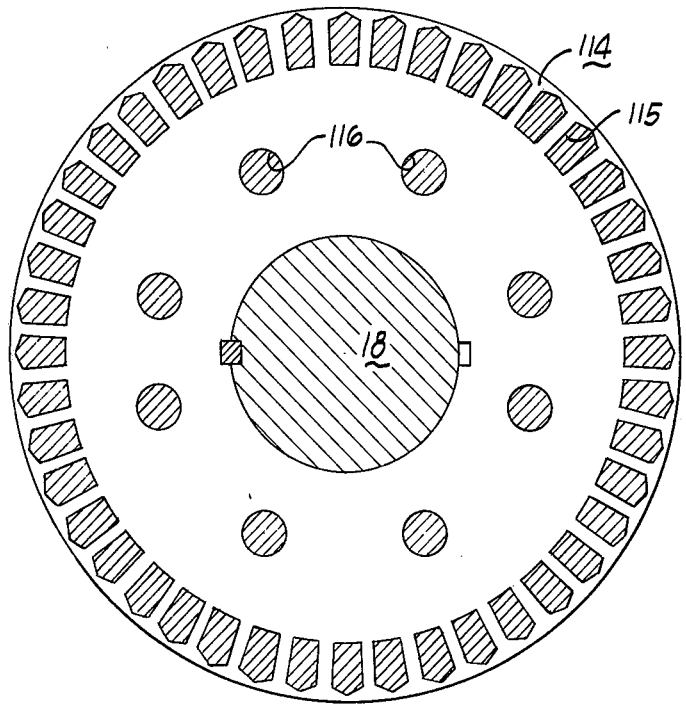
Fig 10

DIRECT AXIS AIDING PERMANENT MAGNETS FOR A LAMINATED SYNCHRONOUS MOTOR ROTOR

BACKGROUND OF THE INVENTION

Synchronous motors are utilized in textile and glass inudstries and other applications requiring precise synchronization of multiple motors. Often these multiple motors are energized from variable frequency sources to provide high or low speed. In many prior art applications these multiple motor drives have used synchronous motors of the reluctance type such as in U.S. Pat. Nos. 3,126,493 or 3,652,885. These did eliminate the need for DC excitation power to the motor field, yet such motors had poor power factor and tended to be slightly unstable at low speeds, i.e., certain low frequency operating points.

The prior art synchronous permanent magnet motors have usually been constructed with either Alnico or Ferrite magents in the rotor. The Alnico magnets have a fairly high induction density but unfortunately have a very low coercive force so that the magnets are readily demagnetized by the M.M.F. from the primary winding on the stator of the motor. Conversely, Ferrite magnets have good coercive force but have low induction density. With such magnets, the rotor volume must be increased considerably to obtain acceptable power factor and horsepower rating. Thus the motor is large for its horsepower rating and uneconomical to manufacture as well as having an inherent lower maximum speed before disintegration. A motor of this type is illustrated in U.S. Pat. No. 3,492,520. Permanent magnet synchronous motors currently manufactured by some manufacturers are ones wherein the magnets are disposed in the rotor with the long dimension radially and magnetized circumferentially and thus two magnets act in parallel to supply the flux for a given pole on the rotor. This has the disadvantage that the shaft must be non-magnetic or must have a non-magnetic sleeve in order to avoid degradation of performance by leakage flux from one face of the magnet through the shaft and back to the other face of the magnet. Also leakage flux can have a path from one face of the magnet to the other through a magnetic bridge along the outer periphery of the rotor which further bleeds flux away from the useful flux crossing the air gap to the stator.

The problem to be solved therefore is how to construct a permanent magnet synchronous motor which has a small physical size, is economical to manufacture for its horsepower rating, will withstand high rotational speeds yet one which has high power factor and efficiency.

SUMMARY OF THE INVENTION

This problem is solved by a permanent magnet synchronous motor having a rotor comprising, in combination, a shaft journalled about an axis, magnetically permeable inner and outer portions of said rotor defining a plurality of magnet apertures, a plurality of magnets in said magnet apertures, said inner portion lying between said magnets and said shaft and said outer portion lying between said magnets and the other periphery of said rotor, said magnets being magnetized to establish an even plurality of magnetic poles on the periphery of said rotor by the flux of said magnets, and a plurality of reinforcing ribs disposed substantially along the magnetically neutral axes intermediate the magnetic poles mechanically interconnecting said inner and outer portions for resisting centrifugal force on said outer portion during rotation.

Accordingly, an object of the invention is to provide a new and improved permanent magnet synchronous motor, namely, a motor which provides greater torque, high power factor, and higher efficiency than prior art synchronous induction motors of the same size.

Another object is to employ superior performance Rare Earth magnets to achieve optimum design performance for synchronous motors.

Another object of this disclosure is to overcome the deterioration of motor performance from magnet demagnetization caused by high transient current at pull-out from synchronism and on acceleration from standstill with highest anticipated line voltage.

Another object is to provide an increased amount of direct axis flux in the rotor. This is achieved through the use of Rare Earth magnets that provide high induction along the direct axis, and the use of a rotor structure which minimizes leakage flux by utilizing large flux barriers.

Another object is to provide a high ratio of quadrature axis reactance to direct axis reactance in the synchronous motor rotor so that maximum power output and torque are produced.

Another object is to provide simple means for attaining superior mechanical strength of permanent magnet rotors to allow safe operation at high operating speeds.

Another object is to provide for modular rotor design so that axially short rotor modules containing suitable short magnets can be assembled to provide for several overall rotor lengths and thereby be suitable to achieve multiple ratings in the same machine diameter.

Another object is to secure the permanent magnets by casting around the magnets when die casting the rotor squirrel cage with aluminum or other suitable casting material. Uninterrupted flux barrier and magnet slots continuing radially to rotor slots near the quadrature axes permit the cage material to flow around the magnets.

Another object is to eliminate the necessity for a stainless steel shaft or a non-magnetic sleeve around the usual magnetic steel shaft.

Another object of the invention is to provide radially directed reinforcing ribs along the quadrature axes to hold the rotor together by resisting centrifugal force during rotation.

Another object of the invention is to provide ribs which are sufficiently wide circumferentially to have the requisitive strength yet sufficiently narrow to effectively inhibit leakage flux.

Another object of the invention is to provide a motor which utilizes much tooling from the high production induction motor art for economy of manufacture.

Another object of the invention is to provide a permanent magnet induction motor with a high pull-in and pull-out torque.

Other objects and a fuller understanding of the invention may be had by referring to the following description and claims, taken in conjunction with the accompanying drawing.

BRIEF DESCRIPTION OF THE DRAWING

FIG. 9 is a cross-sectional view of a two-pole rotor constructed according to the invention;

FIG. 10 is a cross-sectional view of the two-pole rotor of FIG. 9 showing a non-magnetic lamination therein;

and FIG. 11 is a partial view, similar to FIG. 3, of a further modification.

DESCRIPTION OF THE PREFERRED EMBODIMENTS

Figure 2:
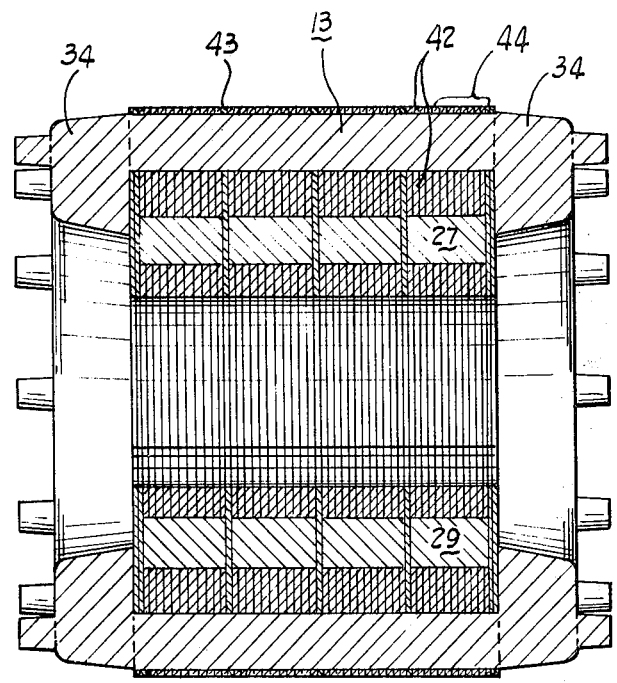
FIG. 2 is a longitudinal sectional view taken on the line 2—2 of FIG. 1.

FIGS. 1-4 illustrate a motor 12 which is a permanent magnet synchronous run and induction start motor. This motor has a rotor 13 and a stator 14 cooperable across a cylindrical air gap 15. The stator 14 has a stator primary winding 16 which is energizable with an alternating voltage to provide a rotating direct axis field or primary M.M.F. The primary winding 16 may be similar to that found in the usual induction motor.

The rotor 13 is mounted on a shaft 18 having an axis 19 and journalled in any suitable manner, not shown, relative to the stator 14. This shaft is not shown in FIGS. 1 and 2. The rotor 13 may be constructed with any even number of poles and a four pole rotor is shown in FIG. 3. The rotor includes magnetically permeable inner and outer portions 21 and 22 which together define walls for four magent apertures 23–26. A plurality of magnets are disposed in the magent apertures in various ways. (The magnets may be axially, tangentially or outwardly disposed.) As shown, this may include only one magnet 27–30 per aperture 23–26, respectively. The inner portion 21 lies between the magnets 27–30 and the shaft 18 and the outer portion 22 lies between the magnets and the outer periphery of the rotor 13. The magnets 27–30 are magnetized in a generally outwardly direction to establish inwardly and outwardly disposed north and south poles on the magnets as indicated on the drawing. This means that adjacent magnets cooperate in providing M.M.F.'s in series in order to establish alternate north and south poles on the periphery of the rotor 13. These magnets establish the direct axis flux such as along axis 35 which is additive to the stator winding direct axis flux at no load. The inner and outer portions 21 and 22 carry the flux of the magnets 27–30 across the air gap 15 to the stator 14 as shown by a path 31 and this path may include the shaft 18 which may be magnetically permeable rather than non-magnetic as in many prior art designs. The outer portion 22 includes conductor bar apertures 32 containing conductor bars 33 which may be individual copper bars, for example, or preferably are cast in place, such as with aluminum or other suitable casting material. The conductor bars 33 form a part of a squirrel cage winding which includes end rings 34 for a short circuited secondary winding on the rotor 13.

The rotor 13 includes a plurality of reinforcing ribs 37–40 which are substantially radially directed along the neutral or quadrature axes intermediate the magnetic poles of the rotor. Pole shoes 36, four in this case, are established between these ribs. These pole shoes are quite wide, over 160 electrical degrees, for good flux conduction to the stator. A quadrature axis 41 is shown in FIG. 3. These ribs 37–40 mechanically interconnect the inner and outer portions 21 and 22, respectively, for resisting centrifugal force on the outer portion during rotation.

Figure 3:
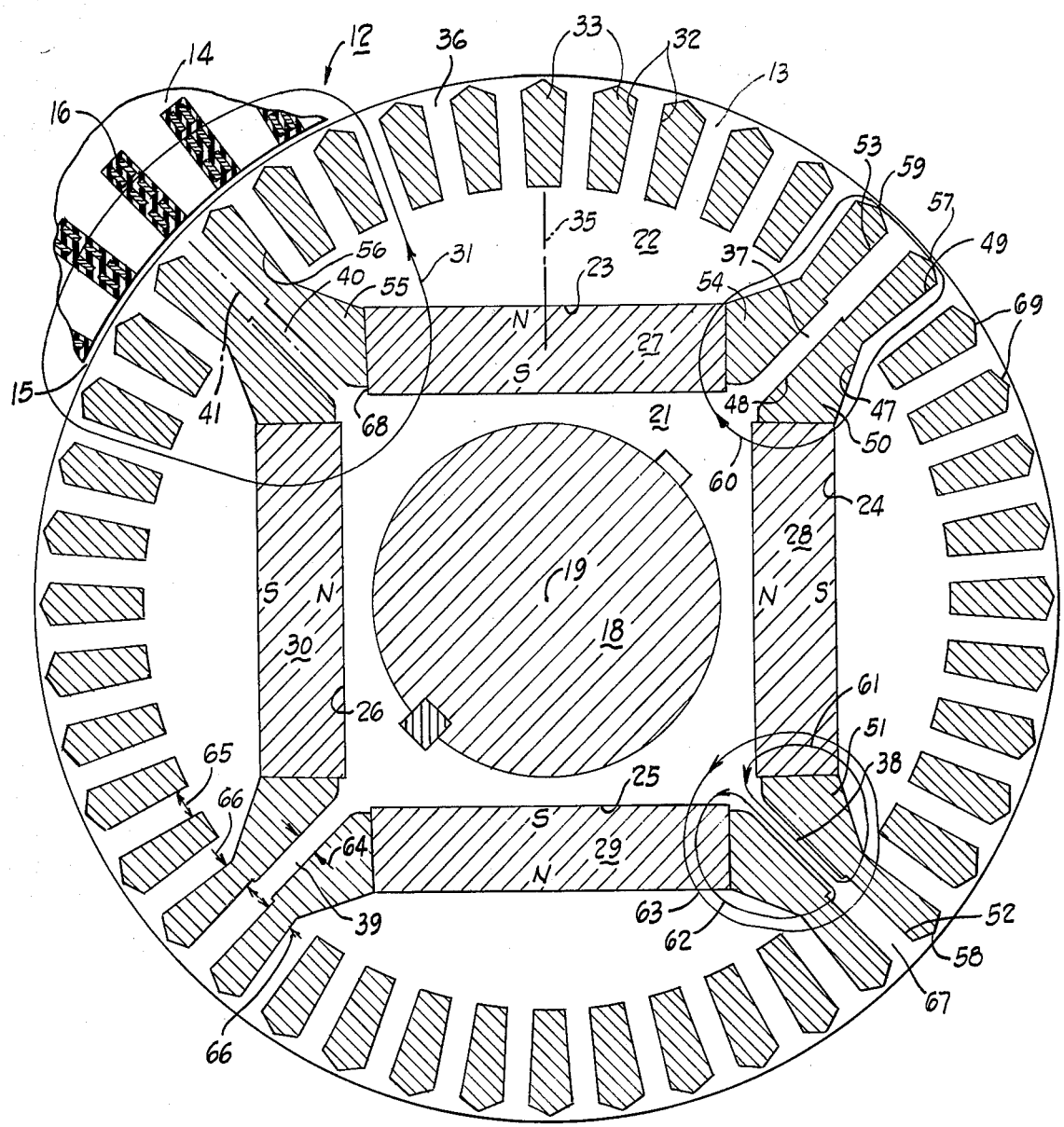
FIG. 3 is an enlarged cross-sectional view of the rotor and part of the stator of the invention.
Figure 4:
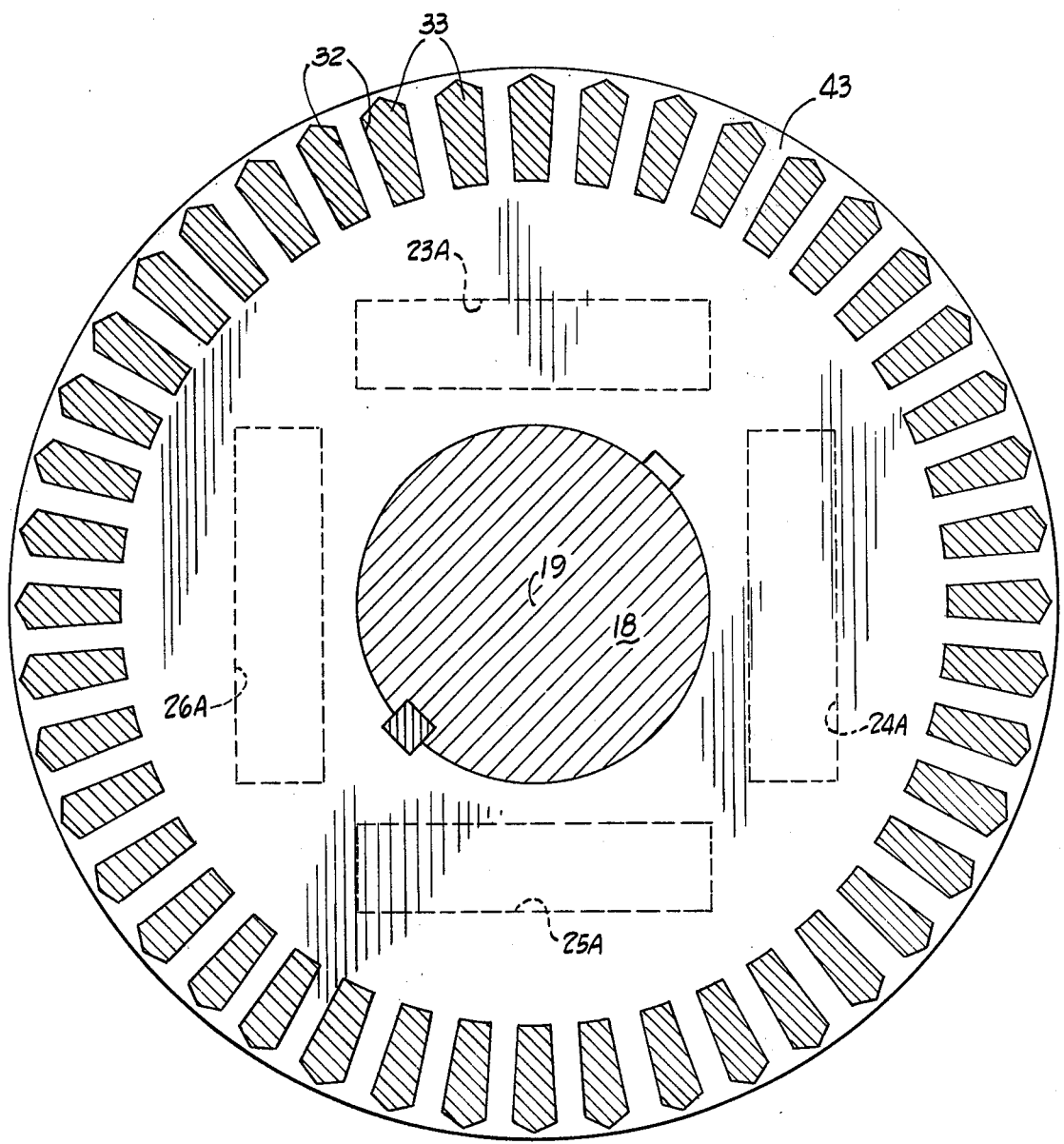
FIG. 4 is an enlarged cross-sectional view of a non-magnetic lamination which may be used in the rotor of the invention in embodiments where the rotor includes a plurality of axially disposed magnets.

The outer portion 22 may be laminated, and in the preferred embodiment the rotor 13 is formed from magnetically permeable laminations 42, as shown in FIG. 2 and each of these laminations has a plurality of these ribs 37–40. The rotor 13 may also optionally include non-magnetic high strength laminations 43 as shown in FIGS. 2 and 4. Such laminations, if used, contain the conductor bar apertures 32 so that the conductor bars 33 may be contained therein and may be continuous throughout the length of the rotor 13. Also such high strength laminations may include the magnet apertures 23A–26A so longer longitudinal length magnets may be used rather than magnets of a length only sufficient to coincide with a module or group 44 of the laminations 42.

The rotor 13 also includes flux barriers to prevent or minimize leakage flux. These flux barriers are non-magnetic spaces and are formed by barrier walls 47 on the outer portion 22 and by barrier walls 48 on the ribs 37–40. These barrier walls 47 and 48 define a flux barrier space. In the four pole construction shown in FIG. 3 there are eight such flux barrier spaces in the preferred embodiment. The inner end of a first conductor bar aperture 49 is connected by a first flux barrier space 50 to one end of the magnet aperture 24. The other end of this magent aperture is connected by a second flux barrier space 51 to the inner end of a second conductor bar aperture 52. A third conductor bar aperture 53 is one which is on the side of the rib 37 opposite the first conductor bar aperture 49. The inner end of this conductor bar aperture 53 is connected by a third flux barrier space 54 to one end of the magnet aperture 23. The other end of this magnet aperture is connected by a flux barrier space 55 to the inner end of a conductor bar aperture 56. This is continued around the rotor and it will be noted that conductor bar apertures 49 and 52, flux barrier spaces 50 and 51 and the magnet aperture 24 form a continuous slot or aperture spanning or embracing the south pole on the periphery of the rotor 13. Such continuous slot extends to near the outer periphery of the rotor at the magnetic bridges 57 and 58. There is a similar magnetic bridge 59 at the outer end of the conductor bar aperture 53.

The magnetic bridges 69 and the outer ends of the squirrel cage conductor bars 33 intermediate the continuous barrier slots do not significantly contribute to the quadrature axis leakage flux, i.e., the flux through ribs 37–40, and may be radially wider than the magnetic bridges 57 and 58.

The ribs 37–40 are sufficiently circumferentially wide for the requisite mechanical strength of the rotor yet sufficiently narrow to allow for a flux barrier 50 and 54 of acceptable width to inhibit excessive leakage flux. This does not necessarily mean that the ribs are of constant width, but that the flux barriers 50, 54 become wider close to the magnets. The flux barriers may also extend further inwardly from the inner magnet face.

During manufacture of the motor 12, the unmagnetized pieces to become the magnets 27-30 are slipped in place in the stack of laminations 44. After that the non-magnetic lamination 43 is added and another stack of laminations 44 plus the magnets 27-30. These stacked sections or modules are added as required to make the desired horsepower rating of the motor. When the entire stack is complete on a dummy shaft, it is placed in the die casting machine and the conductor bars 33 and the end rings 34 are cast in place. At that time the metallic conductor forming the squirrel cage enters the flux barrier spaces and fills them to engage the ends of the magnets 27-30 and securely fasten them in place. The magnets are preferably Rare Earth magnets, such as Samarium-Cobalt magnets and these are very hard and brittle, and must be ground with extreme care and equipment as the fine grinding particles can ignite spontaneously. As a result it is not practical in production to grind the magnets to closely fit within the magnet apertures and they must be a few thousandths of an inch undersize. The squirrel cage material therefore securely holds these magnets in place. After completion of the rotor as shown in FIG. 2, then the entire rotor assembly is preferably placed in a magnetizing fixture to magnetize the bars of magnetic material 27-30 so that they exhibit permanent magnet characteristics. This is not to say that the rotors may not be assembled with the bars 27-30 already magnetized.

Figure 1:
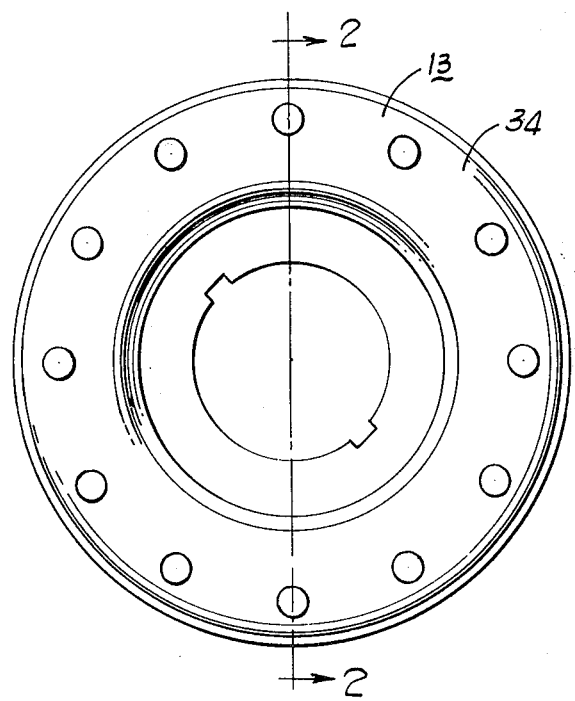
FIG. 1 is an end elevational view of a rotor, minus the shaft, constructed in accordance with the present invention.

The outer portion 22 may be formed from a stack of annular laminations with such annular outer portion secured by the reinforcing ribs to the inner portion 21. Also the inner portion 21 may be formed from a stack of annular laminations and connected by the ribs to the outer portion 22. The ribs may be unitary with either the inner portion or the outer portion or may be completely separate from each and interlocked with each. If separate ribs are used, merely interlocked with the inner and outer portions, then such ribs may be of non-magnetic material such as high strength stainless steel. Where the ribs are unitary with the inner or outer portions, then the ribs are inherently of magnetically permeable material. The preferred embodiment shown in FIGS. 1-3 is one wherein the ribs 37-40 are unitary with the inner and outer portions 21 and 22. Each lamination is a unitary lamination held together by the ribs 37-40 and the magnetic bridges such as 57-59, in addition to the squirrel cage 33, 34.

OPERATION

Compared with the highest coercive force Alnico magnets, Samarium-Cobalt magnets have about the same level of induction density but with about five times the coercive force and over three times the peak energy product; or compared with the best Ferrite magnets, Samarium-Cobalt magnets have more than twice the induction density with about two and one-half times the coercive force and more than five times the peak energy product. Therefore, for the same rating, Rare Earth magnets will be thinner and also require less area. Of major importance is the fact that Rare Earth magnets have practically straight line B-H curves with unsurpassed maximum resistance to demagnetization.

An understanding of the principles involved in the theory of synchronous machines will illustrate the objectives of this disclosure. The classical power formula for synchronous motors, omitting stator resistance, which is small, and friction, and windage and iron losses is:

$$P = m \left[ \frac{VE_o}{X_d} \sine \delta + \frac{V^2}{2} \left( \frac{1}{X_q} - \frac{1}{X_d} \right) \sine 2\delta \right] \quad (1)$$

where m is the number of phases, V is the phase voltage, $E_o$ is voltage induced in the primary winding by the D-c field, $\delta$ is the torque or load angle between V and $E_o$ phase voltages and $X_d$, $X_q$ are the direct and quadrature axis reactances per phase respectively. Thus it is seen that for the synchronous motor, where $X_d$ is inherently large, that maximum power occurs with the second term when the quadrature reactance is as small as is possible.

Similarly, for reluctance synchronous motors, where $E_o$ is zero without rotor excitation, the power equation is derived from the Synchronous motor equation by omitting the first term, or $$P = \frac{mV^2}{2} \left( \frac{1}{X_q} - \frac{1}{X_d} \right) \sine 2\delta \quad (2)$$

Thus, the reluctance synchronous motor also requires as small a value of $X_q$ as possible and a large value of $X_d$ to develop optimum power. An example using magnets to oppose quadrature axis flux and minumize $X_q$ is U.S. Pat. No. 3,126,493. However, power factor is necessarily poor since with no rotor M.M.F., the gap flux must be supplied entirely by primary M.M.F.

However, permanent magnet motors cannot be designed with high direct axis reactance ($X_d$) since the high coercive force magnets required to prevent demagnetization have permeabilities that are low when compared with electrical steel used in Synchronous Machines. Rearrangement of the Synchronous motor power equation will make it more suitable for the permanent magnet synchronous motor, or $$P = m \left[ \frac{VE_o}{X_d} \sine \delta - \frac{V^2}{2} \left( \frac{1}{X_d} - \frac{1}{X_q} \right) \sine 2\delta \right] \quad (3)$$

Then, with high magnet induction making $E_o$ large and with low $X_d$, the first term will be large. The second term will be maximum and additive when $\delta = 135$ degrees and $X_q$ is as large as possible. Accordingly, maximum power for the permanent magnet motor is obtained when the load angle is greater than 90 electrical degrees and less than 135 electrical degrees and with $X_d$ small and $X_q$ large. High power factor requires a high $E_o$ value, resulting from high magnet induction, large magnet area, or large number of effective stator coil turns.

Since it is undesirable to increase machine volume and number of stator winding turns, the present invention utilizes Rare Earth magnets to achieve larger ratings and higher power factors in usual frame sizes for inductance motors and, moreover, provide much greater resistance to demagnetizing forces. The present invention discloses improvements in rotor construction required for the embodiment of Rare Earth magnets. Moreover, since motors for textile drives operate over a wide speed range, by variable frequency control, to 12,000 RPM or higher, the present structure attains the necessary mechanical strength for these speeds when required without resorting to complicated parts or extra operations.

The motor 12 of FIGS. 1-4 starts as an induction motor and runs at synchronous speed. The stator winding 16 is energizable with an alternating voltage to establish a rotating primary field. This co-acts with the squirrel cage winding 33-34 to start the rotor 13 under induction motor principles. It will be noted from FIG. 3 that the squirrel cage winding is one with wide and relatively large conductor bars for a very low resistance squirrel cage. The conductor bars 33 are wider than the teeth 65 so that the conductor bars occupy a majority of the volume near the periphery of the rotor. This gives good starting torque and high sub-synchronous speed so that this sub-synchronous speed is very close to synchronous speed for good pull-in torque. It also provides very good pull-out torque upon overload. This low resistance squirrel cage is aided by the filling of the flux barriers such as 50, 51, 54 and 55 with the metallic conductor of the squirrel cage. The design of the rotor as illustrated in FIG. 3 provides in each pole shoe 36 almost a full 180 electrical degrees of pole span for the magnetic flux of the magnets to depart from and return to the rotor 13 across the air gap 15. This provides minimum reluctance for good flux linkage with the stator 14. As illustrated in FIG. 3 the conductor bar apertures or slots 32 may be wider than the magnetic teeth therebetween. Also it will be noted that in FIG. 3 all of the conductor bar apertures 32 are identical which utilizes a maximum of conventional induction motor tooling and production machinery for economy of manufacture of the motor, although it is understood that equal spacing of conductor bar apertures is not necessary for the practice of the invention.

In FIG. 4 the high strength non-magnetic laminations 43 may have small apertures, if desired, at the radial and peripheral positions corresponding with the flux barrier spaces 50, 51, 54 and 55. Such small apertures are shown as apertures 116 in FIG. 10, described below. This will help permit flow of metallic casting material into these flux barrier spaces, such as 50, 51, 54 and 55.

The reinforcing ribs 37-40 are significant novel features of the invention. First, these ribs provide mechanical strength to the outer portion 22. This outer portion 22 by itself is an annular magnetically permeable portion connected by the magnetic bridges 57-59. The ribs 37-40 are placed under tension during rotation of the rotor and resist centrifugal force on the outer portion 22. The ribs 37-40 impart sufficient strength to the entire rotor structure so that operation at 1800 rpm with a 3.65 inch diameter rotor does not require any high strength non-magnetic laminations 43. These laminations are primarily used at high speed applications such as 8,000 to 12,000 rpm.

A second feature of the ribs is that they establish the laminations as unitary laminations rather than several separate pieces in one lamination layer. This makes the unitary lamination easy to handle during initial punching, trimming, stacking on an arbor, insertion of the magnet slugs 27-30, and placing in the die-casting machine for forming the squirrel cage 33-34.

A third feature of the ribs is that they establish a minimum degradation of the magnetic and electrical performance of the motor. FIG. 3 illustrates first, second, third and fourth leakage paths 60-63, respectively, whereby flux from one face of a magnet may leak to the opposite face without being a working flux; namely, without crossing the air gap 15 to the stator 14. The leakage path 61 is that from magnet 28 radially outwardly through the rib 38. The leakage path 62 is from the magnet 29 radially inwardly through this same rib 38. Assuming the theoretically perfect condition of equal strength of the magnets 28 and 29, then these two opposing fluw leakage paths will be equal and in opposition for a zero net leakage flux lengthwise along the ribs 37-40. The ribs 37-40 are narrow in circumferential width compared to their length. In one motor actually constructed in accordance with the present invention, the rotor was 3.650 inches in diameter, the magnetic bridges 57-59 were 0.010 inches in radial dimension, the ribs 37-40 were 0.080 inches wide, the magnetic tooth width 65 between conductor bar apertures 33 was 0.104 inches, and the conductor bar apertures 32 had a minimum width of 0.102 inches as shown at dimension 66. Considering then the leakage flux path 63 wherein the M.M.F.'s of the two magnets 28 and 29 are in series, this leakage flux must bridge two of the conductor bar apertures 32 and the rib 38, or its extension, the magnetic tooth 67. The rib 38, which includes the magnetic tooth 67, has a circumferential width which is less than the minimum width of the two flux barriers established at the inner end of the conductor bar apertures. The fact that this leakage path 63 has to jump two flux barriers, one on each side of the rib 38, means that this leakage path contains only a minimum amount of leakage flux. This contributes considerably to the high efficiency and high power factor of the motor 12. In the motor constructed in accordance with the invention, the efficiency was 86.7 percent and the power factor was 82.5 percent. This gave an apparent efficiency of the product of the two of 71.5 percent. This was with 60 hertz energization and 1800 rpm operation on a two horsepower motor which had a pull-out torque of 11.85 lb. feet and a pull-in torque of 7.3 lb. feet.

The above discussion illustrates that the ribs provide a fourth feature; namely, that the leakage flux in path 63 must jump two flux barriers rather than only one, and this is a relatively wide flux barrier for minimum flux leakage. A fifth feature is that the width of these two flux barriers, at dimension 66, is a combined width greater than the width of the rib at dimension 64 or at dimension 65.

An optional locating step 68 is shown on the inner portion 21 to locate the magnets 27-30, but may be on the outer portion 22 or omitted entirely.

The ribs 37-40 provide a sixth feature of the invention; namely, that they establish a continuous magnet slot or aperture which spans the pole. This establishes the pole as being in excess of 160 electrical degrees in width for a maximum amount of permeable material to conduct the direct axis flux, even considering the relatively narrow teeth 65 or 67 and the relatively wide slots 32. This continuous slot spanning the pole may be made quite wide especially at the flux barriers 50, 51, 54 and 55 in order to minimize the flux leakage and provide a maximum of useful flux from the magnets.

The structure of the rotor is peculiarly adapted to take advantage of the best properties of the Rare Earth permanent magnets. These magnets are relatively wide compared to their thickness permitting a small rotor diameter in turn permitting high speeds. Further, the thin plate-like magnets permit ample volume outboard of the magnets to accommodate a low resistance squirrel cage and adequate flux yoke for high starting torque.

The plate-like magnets are thin in a dimension along the direct axis 35 and wide in a dimension perpendicular thereto. The magnets are positioned close to the shaft and flux passes through this shaft. The dimension of the outer portion 22 along one of the direct axes is approximately double that of the combined dimensions of the magnet aperture and inner portion 21 along that same direct axis. This provides a large volume to the outer portion 22.

There will also be a magnetic flux leakage path 60 through the magnetic bridges 57 and 59, for example, around the end of the rib 37. Since these magnetic bridges may be made relatively thin such as 0.010 inches, these bridges will readily saturate and minimize the leakage flux in this path. It is evident from the drawing of FIG. 3 that with low permeability Rare Earth magnets compared with the permeability of the rotor steel and with radially wide magnet apertures 23, that the direct axis reactance is low relative to the primary M.M.F. while the flux paths between quadrature axes outboard of the magnets in the outer portion 22 are not impeded and yield a high quadrature reactance and a large ratio of $X_q$ to $X_d$. According to equation (3) above, this yields a high pull-out torque for an improved performance motor.

Figure 5:
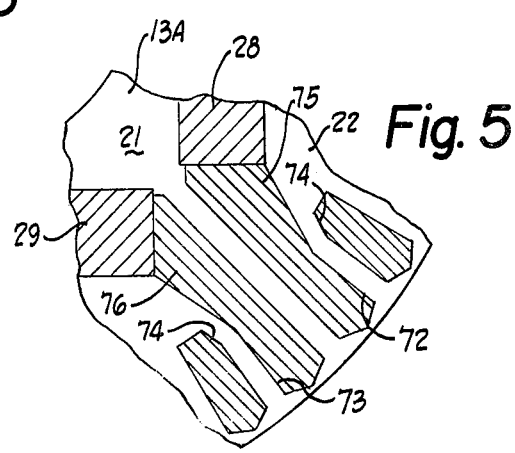

FIG. 5 is a modification of the rotor and shows a partial view similar to the sectional view of FIG. 3. In FIG. 5 the reinforcing rib 38A is illustrative of all ribs in the motor and this exemplary form of rib has a constant circumferential width all the way from the inner portion 21 to the outer portion 22, including the magnetic tooth between the conductor bar apertures 72 and 73. These apertures have been made slightly wider in order to increase the flux barrier width. Also the next adjacent conductor bar apertures have been beveled at the corners as at numeral 74 in order to accommodate the wide flux barrier spaces 75 and 76 and yet provide magnetically permeable material for adequate conduction of flux between the beveled corner 74 and the flux barrier spaces 75 and 76. Whereas in FIG. 3 the conductor bar apertures 32 were all uniform in size to aid in the ease of manufacture of that lamination, the embodiment of FIG. 5 does enlarge two of the conductor bar apertures 72 and 73 and modifies the shape of the next adjacent conductor bar apertures in order to improve the electrical and magnetic performance of the motor. The rib 38A retains its same tensile strength yet the leakage flux is reduced even further to still further improve the power factor of the motor.

Figure 6:
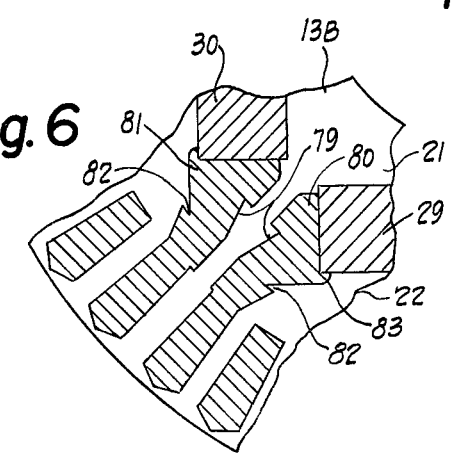
FIGS. 5 and 6 are partial views, similar to FIG. 3, but of different modifications.

FIG. 6 is a further modification of a rotor 13B wherein only one of the reinforcing ribs 39B is shown and this is representative of all four of the ribs of the rotor. The conductor apertures may be all uniform as in FIG. 3 or may be of variable width as shown in FIG. 5, however the primary difference in the ribs is that lugs or projections 79 are provided thereon to interlock with the cast metal in the flux barrier spaces 80 and 81. These serve to lock the die cast rotor cage to the hub portion or inner portion 21 of the rotor and prevent the possibility of a slight shift of this cage and outer portion 22 with high speeds. Additionally, the outer portions 22 are provided with projections 82 to lock this cage to the outer portions 22 and thus impart additional strength to the entire rotor. Still further the outer portions 22 are cut away at 83 so that the metal of the squirrel cage engages a part of the outer surface of the magnets 27-30. In this way the mass of the squirrel cage metal may be used to resist centrifugal force on the magnets as well as the outer portions 22 to gain additional high speed strength.

FIG. 9 is a sectional view, similar to the view of FIG. 3, through a two pole rotor 93. This rotor has inner and outer portions 94 and 95 which are interconnected by reinforcing ribs 96 and 97. Again, either the inner or outer portions 94 and 95 may be a stack of laminations and preferably the ribs 96 and 97 are unitary with these portions. The outer end of the ribs are forked and connected to two teeth 98 and 99 between adjacent conductor bar apertures 100, which are shown as being all uniform around the periphery of the rotor 93.

The inner and outer portions 94 and 95 together define magnet apertures 101 and 102. A plurality of magnets are mounted in these magnet apertures and in the aperture 101 there may be one or more magnets. As shown, there are three such magnets 103 in the magnet aperture 101 and there are three such magnets 104 in the magnet aperture 102. Flux barriers 105 are provided between the ends of the magnet apertures and the inner end of a conductor bar aperture 100. This again provides a substantially continuous aperture from one periphery of the rotor to the other periphery spanning a pole. The flux barriers are filled with conductive material 106, a part of the squirrel cage of the rotor 93. Flux leakage paths 107, 108 will be present from one face of the magnet 103, 104 to the other face of this same magnet. The flux in the leakage path 107 must bridge across the narrowest part 109 of a conductor bar aperture, and the width of two of these conductor bar apertures is greater than the circumferential width 110 of the ribs 96, 97. This minimizes the amount of flux in the flux leakage paths 107 or 108 or the combined path where the flux from the two magnets 103 and 104 would be in series.

FIG. 10 illustrates a high strength non-magnetic lamination 114 which may be used in place of the non-magnetic laminations 43 of FIG. 2 in a complete two-pole rotor. These laminations may be provided in the complete rotor with an axial spacing as necessary to withstand the centrifugal force, depending upon the maximum speed of the rotor 93. Such non-magnetic lamination 114 has the conductor bar apertures 115 therein coinciding with the conductor bar apertures 100 in the magnetically permeable lamination shown in FIG. 9. This allows flow of the cast metal to form the squirrel cage.

The non-magnetic laminations 114 also are provided with apertures 116 which permit introduction of the cast metal of the squirrel cage into volumes 117 which lie between the magnets 103 and which lie between the magnets 104, as shown in FIG. 9. These volumes 117 of cast metal retain the magnets 103 and 104 in place and also form flux barriers to inhibit magnetic flux leakage from one face of a magnet to the other.

The operation of the rotor 93 of FIGS. 9 and 10 is similar to that for the rotor 13 of FIGS. 1-4. Only two poles are established on the rotor 93 with one pole being at the periphery at the top of FIG. 9 and the other opposite pole being at the bottom of the periphery of the rotor. The magnetic flux will pass through the magnetically permeable shaft 18, and this is an advantage because this shaft need not be non-magnetic as in many prior art constructions. The ribs 96 and 97 are provided to secure the outer portion 95 to the inner portion 94 and are shown unitary therewith. This again provides all six advantages of the ribs as set forth above for the four pole construction of FIGS. 1-4. The fact that the ribs 96 and 97 have a forked end to include the two magnetic teeth 98 and 99 provides a definite increase in stiffness or rigidity to the unitary lamination to permit better handling characteristics to this lamination during stamping, stacking and the other rotor forming steps.

Figure 7:
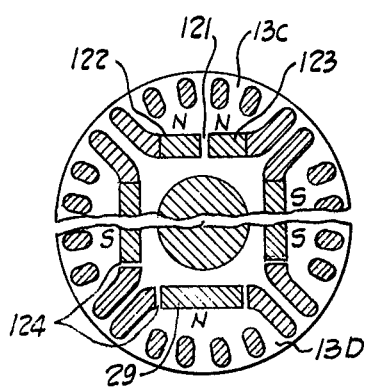
FIGS. 7 and 8 are cross-sectional views to a smaller scale of still further modifications of the invention.

FIG. 7 illustrates two further modifications to the four pole rotor construction of FIGS. 1–4. The upper half of this FIG. 7 illustrates that the modified rotor 13C may have a magnetic bridge 121 interconnecting the inner and outer portions 21 and 22. This magnetic bridge will be placed in tension during rotation due to the centrifugal force but will help secure the inner and outer portions together. This magnetic bridge will preferably be narrow in circumferential width in order to minimize the amount of leakage flux which will pass lengthwise through this bridge from the north to the south pole of the separate magnets 122, 123. Due to the narrow width of this bridge 121, it will readily saturate under the normal flux from the magnets 122, 123. By the use of these magnetic bridges 121, which may be used in all four magnet apertures, the strength of the rotor will be increased so that the non-magnetic laminations 43 may not be necessary, depending upon the maximum speed contemplated for the rotor.

The lower part of FIG. 7 shows a still further modification of a rotor 13D in which two magnetic bridges 124 are provided, one at each end of the magnets such as magnet 29. Again these magnetic bridges 124 will be narrow in circumferential width to limit the leakage flux from one face to the other of the magnet 29.

Figure 8:
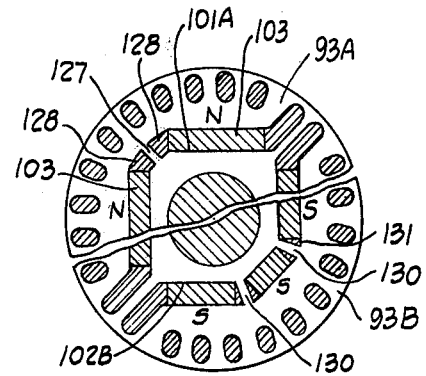

FIG. 8 illustrates two further modifications of the two pole rotor 93. The upper half of FIG. 8 shows a two pole rotor 93A wherein the magnet aperture 101A has a right angle configuration in order to accommodate two magnets 103. A magnetic bridge 127 is provided intermediate the magnets 103 to join the inner and outer portions of the rotor 93A. This flux bridge 127 separates two flux barriers 128 which preferably are filled with cast metal to hold the magnets in place.

The lower half of FIG. 8 illustrates a rotor 93B which may have the magnet aperture 102B so constructed as to be in three parts separated by magnetic bridges 130. Again the flux barriers 131 may be filled with cast metal to retain the magnets in place. As shown in FIG. 8 the magnetic bridges 127 or 130 will be narrow in circumferential width to limit the amount of leakage flux passing from one face to the other of the magnets. By the use of these magnetic bridges 127 and 130, the magnetic performance of the motor will be degraded slightly due to the leakage flux through the saturated magnetic bridges, however the strength of the rotor is increased to permit higher speed operation. By the use of these magnetic bridges, the non-magnetic laminations may not be necessary in order to strengthen the rotor. If non-magnetic laminations are provided then they may have apertures, such as apertures 116 shown in FIG. 10, in order to permit introduction of the cast metal to the flux barrier spaces such as 128 and 131.

FIG. 11 shows a further modification of a rotor 13E, illustrated as a four pole rotor. This structure has arcuate magnet apertures 135 containing a plurality of arcuate magnets 136. Tapered reinforcing ribs 137 extend substantially radially along the quadrature axes, separating flux barriers 138 which extend to points near the rotor periphery.

The rotor shown in the figures may easily be adapted to any desired number of poles. In FIG. 9, for example, instead of only two ribs 96 and 97, there may be six such ribs with accompanying flux barriers extending to the rotor periphery in order to provide a six pole rotor. The squirrel cage shown in all the figures is a large low resistance squirrel cage and the conductor bars form damper windings to resist demagnetization of the magnets during high slip frequencies such as at starting conditions of the rotor as an induction motor. Despite the large cross-sectional area of these conductor bars, the individual poles at the periphery of the rotor have a large iron content extending completely across the arcuate periphery of that particular pole shoe, so as to allow the flux from the magnets to cross the air gap 15 to the stator 14 and thus be a working flux establishing torque of the motor. A majority of the flux in the air gap 15 is from the magnets 27–30 rather than from the stator winding 16, as is the case in a synchronous reluctance motor. This permits performance with higher efficiency of the motor of the present invention compared to synchronous reluctance motors. The stator winding 16 is provided only to establish a rotating field which cooperates with the flux from the magnets 27–30 to provide the synchronous speed.

The various modifications show different forms of the invention wherein a permanent magnet synchronous motor is shown which has a small physical size, is economical to manufacture for its horsepower rating, and will withstand high rotational speeds yet one which has high power factor and efficiency. This motor is able to utilize a considerable amount of tooling from high production induction motor manufacture and this promotes economy of manufacture. Also the unitary laminations mean that these laminations are easy to handle throughout the fabrication of the complete rotor and this also promotes economy of manufacture. The unitary laminations are established by the ribs which provide mechanical strength to hold the outer portions to the inner portions so that in many cases no non-magnetic laminations for strength are required. The ribs are narrow in circumferential width for minimum flux leakage and in fact the flux leakage lengthwise through one rib from one magnet is in opposition to the lengthwise flux from the adjacent magnet. This establishes substantially zero net leakage flux.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A rotor for a permanent magnet synchronous motor having a stator developing a rotating direct axis flux comprising, in combination, a shaft journalled about an axis, magnetically permeable inner and outer portions of said rotor defining a plurality of magnet apertures, a plurality of magnets in said magnet apertures, said inner portion lying between said magnets and said shaft and said outer portion lying between said magnets and the outer periphery of said rotor, said magnets being magnetized to establish an even plurality of magnetic poles on the periphery of said rotor by the flux of said magnets and with the flux of said magnets being additive to the direct axis flux of the stator at no load, and a plurality of reinforcing ribs disposed substantially along the magnetically neutral axes intermediate the magnetic poles mechanically interconnecting said inner and outer portions for resisting centrifugal force on said outer portion during rotation.

2. A rotor as set forth in claim 1, including a plurality of conductor bar apertures around the periphery of each of said laminations, and metallic conductor means in said conductor bar apertures.

3. A rotor as set forth in claim 2, including first flux barrier walls in said rotor connecting the inner end of a first conductor bar aperture to an end of a first of said magnet apertures and defining a first flux barrier to leakage flux of a first of said magnets.

4. A rotor as set forth in claim 3, including metallic conductor means in the space of said flux barrier.

5. A rotor as set forth in claim 4, wherein said metallic conductor means in said flux barrier space engages said first magnet in said first magnet aperture to aid in holding said first magnet in place.

6. A rotor as set forth in claim 3, including second flux barrier walls in said rotor connecting the inner end of a second conductor bar aperture to an end of said first magnet aperture and defining a second flux barrier to leakage flux of said first magnet.

7. A rotor as set forth in claim 6, wherein said first magnet aperture, said first and second flux barrier spaces and said first and second conductor bar apertures define a substantially continuous aperture embracing a pole on said rotor from part of the rotor periphery to another part of the rotor periphery.

8. A rotor as set forth in claim 3, including a third conductor bar aperture adjacent said first conductor bar aperture, third flux barrier walls in said rotor connecting the inner end of said third conductor bar aperture to an end of a second magnet aperture and defining a third flux barrier to leakage flux from a second magnet in said second magnet aperture.

9. A rotor as set forth in claim 8, wherein said first and third conductor bar apertures are on opposite sides of one of said ribs, and the minimum circumferential width of said combined first and third flux barrier is greater than the maximum width of said one of said ribs to inhibit leakage flux circumferentially across said first and third flux barriers from the series combination of said first and second magnets.

10. A rotor as set forth in claim 1, wherein said magnetically permeable outer portion is formed from a stack of annular laminations.

11. A rotor as set forth in claim 10, wherein said magnetically permeable inner portion is formed from a stack of annular laminations.

12. A rotor as set forth in claim 1, wherein said magnetically permeable inner and outer portions are formed from a stack of unitary laminations.

13. A rotor as set forth in claim 1, wherein said ribs have a length greater than the radial dimension from the outer periphery of said rotor to said magnets.

14. A rotor as set forth in claim 1, wherein each of said ribs has a radial length substantially equal to the radial dimension from the periphery of said shaft to the periphery of said rotor.

15. A rotor as set forth in claim 1, wherein each of said ribs is magnetically permeable.

16. A rotor as set forth in claim 15, wherein the width of each of said ribs is narrow relative to the radial length thereof to restrict the flow of leakage flux from said magnets.

17. A rotor as set forth in claim 15, wherein the leakage flux from the magnet on one side of one rib is lengthwise through that rib in opposition to the leakage flux from the magnet on the other side of that rib to have a minimum net leakage flux lengthwise through that rib.

18. A rotor as set forth in claim 1, wherein said shaft is magnetically permeable.

19. A rotor as set forth in claim 1, including a non-magnetic lamination in said rotor having an absence of magnet apertures in order to increase the resistance to centrifugal force of said rotor.

20. A rotor as set forth in claim 19, wherein said non-magnetic lamination has a plurality of apertures communicating with said magnet apertures to permit introduction of metallic conductor means thereinto.

21. A rotor as set forth in claim 1, wherein said ribs are disposed substantially radially.

22. A rotor as set forth in claim 1, wherein said magnets are magnetized substantially radially to establish a substantially radially oriented direct axis flux to said magnetic poles.

23. A rotor as set forth in claim 2, including
a primary winding on the stator energizable to establish a rotating magnetic field for cooperation with said metallic conductor means as a secondary winding for starting of the rotor as an induction motor and for cooperation with said magnetic poles of said rotor to run said rotor at synchronous speed.

24. A rotor as set forth in claim 1, wherein two adjacent magnets have M.M.F.'s disposed in series per pair of poles.

25. A rotor as set forth in claim 1, wherein one of said ribs lies between two adjacent magnets with a leakage path from one magnet lying lengthwise through said one of said ribs and the leakage path from the adjacent magnet lying lengthwise in opposition through that same rib.

26. A rotor as set forth in claim 1, wherein said ribs have a constant circumferential width throughout the length thereof.

27. A rotor as set forth in claim 1, including a magnetic bridge bridging a portion of one of said magnet apertures from said inner to said outer portion of said rotor and dividing said one magnet aperture into at least two parts.

28. A rotor as set forth in claim 2, including a magnetic tooth between adjacent conductor bar apertures effecting a radial extension of each said rib,
said magnetic tooth having a larger circumferential width than said ribs.

29. A rotor as set forth in claim 2, including interlocking projections between said metallic conductor means and said ribs.

30. A rotor as set forth in claim 2, wherein each said magnet aperture is a continuous aperture having at least two angularly related pockets,
and separate magnets disposed in said at least two pockets.

31. A rotor as set forth in claim 30, including a non-magnetic lamination in said rotor,
and apertures in said non-magnetic lamination to establish said metallic conductor means in the volume between said separate magnets in said two pockets.

32. A rotor as set forth in claim 1, wherein said magnet apertures are circular arcs.

33. A rotor as set forth in claim 1, including a non-magnetic lamination in said rotor included in said inner and outer portions of said rotor, and a plurality of magnet apertures in said non-magnetic lamination to accommodate said plurality of magnets.

34. A rotor for a permanent magnet synchronous motor having a stator developing a rotating direct axis flux comprising, in combination, a shaft journalled about an axis, magnetically permeable inner and outer portions of said rotor defining a plurality of magnet apertures, a plurality of magnets in said magnet apertures, said inner portion lying between said magnets and said shaft and said outer portion lying between said magnets and the outer periphery of said rotor, said magnets being magnetized to establish an even plurality of magnetic poles on the periphery of said rotor by the flux of said magnets and with the flux of said magnets being additive to the direct axis flux of the stator at no load, said magnet apertures being elongated and considerably more narrow in a dimension along a rotor radius than the dimension parallel to a tangent to the shaft, said magnet apertures being positioned relatively closely to said shaft to establish said outer portion of said rotor with a larger radial dimension than that of said inner portion, said outer portion forming a large volume relative to said inner portion for a large pole shoe on each pole to carry the flux of said magnets, and said pole shoe having a wide arc in the order of 160 electrical degrees.

35. A rotor as set forth in claim 34, including a squirrel cage conductive winding on said rotor with conductor bars in said outer portion of said rotor, said conductor bars occupying a majority of the volume near the periphery of the rotor.

36. A rotor as set forth in claim 35, wherein said conductor bars are substantially uniformly spaced around the periphery of said rotor.

37. A rotor as set forth in claim 35, wherein said conductor bars are substantially uniformly spaced on each pole shoe and throughout substantially the complete arcuate expanse of each pole shoe.

38. A rotor as set forth in claim 34, wherein said magnets are magnetized along direct axes which are substantially radial, and the dimension of said outer portion along one said direct axis exceeds the combined dimensions of said magnet aperture and inner portion along said one direct axis.

39. A rotor as set forth in claim 38, wherein the dimension of said outer portion along said one direct axis is approximately double the combined dimensions of said magnet aperture and inner portion along said one direct axis.

40. A rotor as set forth in claim 34, wherein the volume of magnetically permeable material in said outer portion exceeds the volume of magnetically permeable material in said inner portion.

* * * * *